United States Patent [19]

Lee

[11] Patent Number: 5,135,687
[45] Date of Patent: Aug. 4, 1992

[54] PROCESS FOR MAKING PVP/PARA-ARAMID FIBERS

[75] Inventor: Kiu-Seung Lee, Richmond, Va.

[73] Assignee: E. I. Du Pont de Nemours and Company, Wilmington, Del.

[21] Appl. No.: 606,084

[22] Filed: Oct. 30, 1990

Related U.S. Application Data

[62] Division of Ser. No. 361,411, Jun. 5, 1989, Pat. No. 5,073,440.

[51] Int. Cl.$^5$ .............................................. D01F 6/90
[52] U.S. Cl. ........................................ 264/28; 264/184; 264/210.6; 264/210.7; 264/120.8; 264/211.15; 264/211.16; 264/233
[58] Field of Search ................... 264/184, 171, 211.14, 264/211.16, 28, 184, 210.6, 210.7, 210.8, 211.15, 233

[56] References Cited

U.S. PATENT DOCUMENTS

| | | | |
|---|---|---|---|
| 3,767,756 | 10/1973 | Blades | 264/184 |
| 3,869,429 | 3/1975 | Blades | 260/78 S |
| 4,224,271 | 9/1980 | Tse | 264/184 |
| 4,228,218 | 10/1980 | Takayanagi et al. | 525/58 |
| 4,278,779 | 7/1981 | Nakagawa et al. | 525/432 |
| 4,622,265 | 11/1986 | Yoon et al. | 428/364 |
| 4,721,755 | 1/1988 | Maatman | 525/432 |

FOREIGN PATENT DOCUMENTS 0248458 12/1987 European Pat. Off. .
55-69621 5/1980 Japan .

*Primary Examiner*—Hubert C. Lorin

[57] ABSTRACT

A process for making fibers of para-aramid and poly(vinyl pyrrolidone) (PVP) comprising agitating a mixture of solvent acid, para-aramid, and PVP, heating the mixture to form a solution, extruding the solution, drawing the extruded solution, passing the stretched solution through an aqueous coagulating bath to form filaments and washing the filaments.

2 Claims, 2 Drawing Sheets

PPD-T/PVP FIBERS (1000X)

PPD-T FIBERS (1000X)

PPD-T/PVP FIBERS (1000X)

PROCESS FOR MAKING PVP/PARA-ARAMID FIBERS

This is a division of application Ser. No. 07/361,411, filed Jun. 5, 1989, now U.S. Pat. No. 5,073.440.

BACKGROUND OF THE INVENTION

1. Field of the Invention

This invention relates to fibers which are primarily para-aramid and preferably poly(p-phenylene terephthalamide) (PPD-T) and which include, as a spun-in additive, polyvinylpyrrolidone (PVP). The fibers, with the blend of para-aramid and PVP, exhibit tensile properties which are improved over those of fibers made from para-aramid, alone; and the fibers with the blend exhibit a variety of additional benefits such as, improved dyeability, increased stability to ultraviolet radiation, improved strength retention after heat aging, increased adhesion in composite structures, improved flame resistance, and the like.

2. Description of the Prior Art

European patent application No. 248,458, published Dec. 9, 1987 on the application of Maatman et al., discloses fibers made from a blend of PPD-T and another aromatic polyamide.

U.S. Pat. No. 4,224,271, issued Sep. 23, 1980 on the application of Tse, discloses preparation of fibers using an aromatic polyamide and polyacrylonitrile.

U.S. Pat. No. 4,278,779, issued Jul. 14, 1981 on the application of Nakagawa et al., discloses fibers of improved dyeability made from a blend of poly(m-phenylene isophthalamide) and another aromatic polyamide.

U.S. Pat. No. 4,622,265, issued Nov. 11, 1986 on the application of Yoon et al., discloses fibers made from a blend of PPD-T and a regularly ordered aromatic-aliphatic copolymer.

U.S. Pat. No. 4,721,755, issued Jan. 26, 1988 on the application of Maatman, discloses fibers made from a blend of PPD-T and a polyamide containing diaminobenzanilide units.

U.S. Pat. No. 4,228,218, issued Oct. 14, 1980 on the application of Takayanagi et al., discloses a polymeric composite of a polymer having a rigid molecular structure uniformly dispersed in a polymer having a flexible molecular structure.

U.S. Pat. No. 3,869,429, issued Mar. 4, 1975 on the application of Blades, discloses, generally, that polyamides can be blended with as much as 30 percent of a compatible diluent polymer which should be reasonably stable and soluble in the dope solvent.

Japanese patent application Publication (Kokai) 55/69,621, published May 26, 1980, discloses the use of polymers having an affinity with carboxyl groups in polyamide polymerization processes. The polymers having an affinity with carboxyl groups include polyvinylpyrrolidone. The polyvinylpyrrolidone of that publication is used only during the polymerization and is carefully and completely removed before use of the polyamide polymer product.

SUMMARY OF THE INVENTION

The present invention provides a fiber consisting essentially of para-aramid and poly(vinyl pyrrolidone) (PVP). The fiber preferably includes from 5 to 30 percent, by weight, of the PVP based on the weight of the para-aramid; and the para-aramid is preferably PPD-T.

Fibers of the present invention exhibit a filament tenacity of greater than 15 grams per denier and a specific tenacity of greater than 17 grams per denier. The fibers are, generally, out-of-round in cross sectional shape.

This invention, also, provides a process for making such fibers by agitating an anisotropic mixture of acid solvent, para-aramid, and PVP; heating the agitated mixture to above its melting point, extruding the mixture through a spinneret, into and through a noncoagulating layer; and passing the extruded mixture into and through an aqueous coagulating bath.

DETAILED DESCRIPTION OF THE INVENTION

Figure 1:
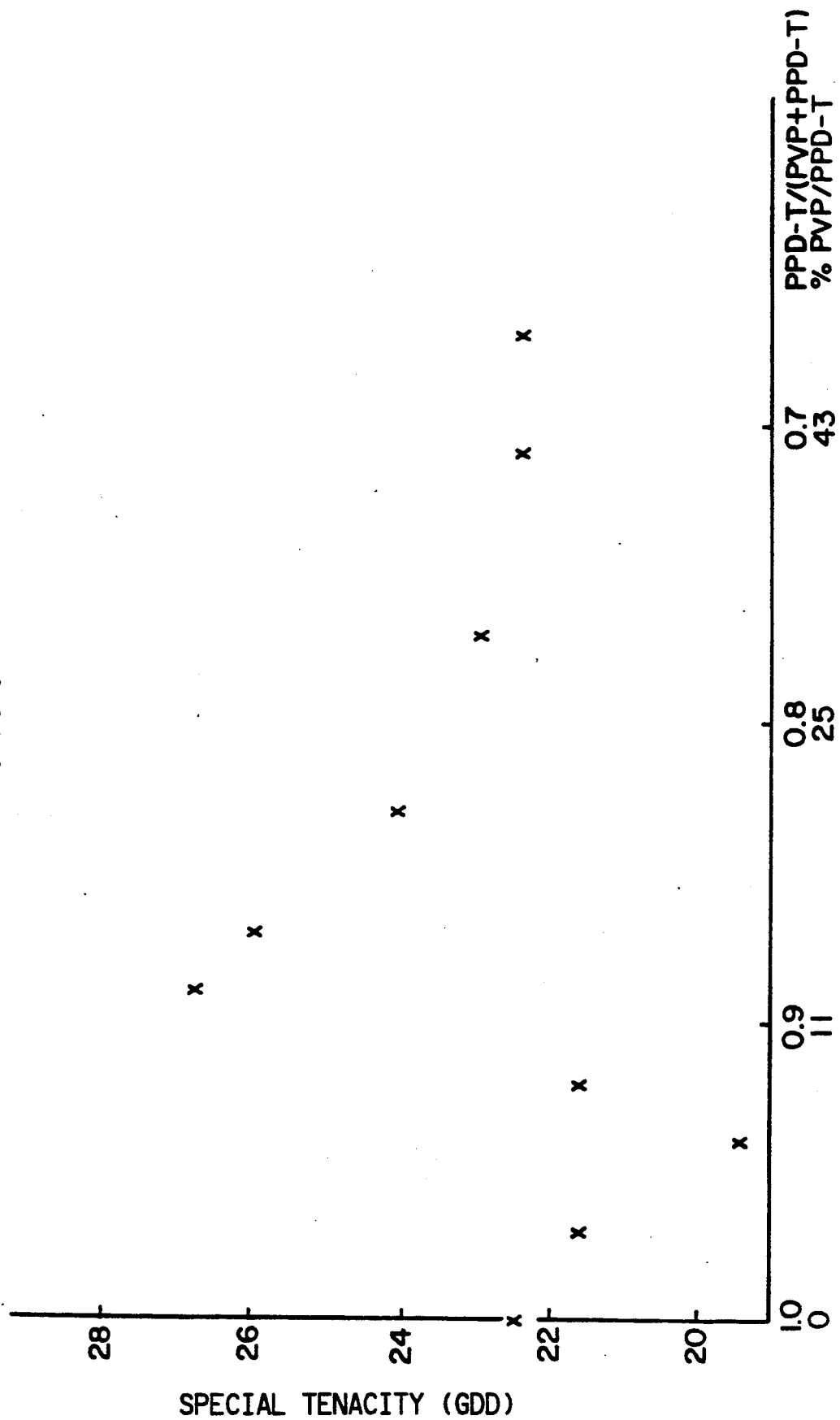
FIG. 1 is a graphical representation of the relationship between specific tenacity and PVP content in fibers of this invention.

Para-aramids are the primary polymers in fibers of this invention and PPD-T is the preferred para-aramid. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or choro- or dichloroterephthaloyl chloride; provided, only, that the other aromatic diamines and aromatic diacid chlorides be present in amounts which permit preparation of anisotropic spin dopes. Preparation of PPD-T is described in U.S. Pat. Nos. 3,869,429; 4,308,374; and 4,698,414.

PVP is the additive polymer in fibers of this invention. By PVP is meant the polymer which results from linear polymerization of monomer units of N-vinyl-2-pyrrolidone and includes small amounts of comonomers which may be present in concentrations below those which do not interfere with the interaction of the PVP with the PPD-T.

It has been determined that PVP of nearly any molecular weight can be used in practice of this invention. PVP of molecular weights ranging from as little as about 5000 to as much as about 1,000,000 have been used and all have resulted in fibers exhibiting the benefits of the present invention. PVP of very high molecular weight yields spinning dopes of high viscosity. PVP with a molecular weight of about 10,000 to about 360,000 is preferred.

Fibers of the present invention are made by spinning a dope of a combination of PPD-T and PVP. The spinning process is generally wet spinning and, more particularly, air gap spinning.

The spinning dope is an anisotropic solution of PPD-T and PVP. The solvent for the spinning dope is sulfuric acid, chlorosulfuric acid, fluorosulfuric acid and mixtures of those acids. Sulfuric acid is usually used and should have a concentration of at least 98%. Fuming sulfuric acid can also be used.

The spinning dope can be prepared by stirring PPD-T and PVP in a finely-divided, particulate, form with the spinning dope solvent—concentrated sulfuric acid, for example. While the acid must be warmed to complete dissolution of the PPD-T and PVP, the temperature should be kept as low as possible to minimize degradation of the polymer. Alternatively, the spinning dope can be prepared by stirring one of the polymers in a finely-divided, particulate form with the spinning solvent and then adding the other polymer to the resulting mixture.

Effective spinning dopes for this invention generally include about 35–45 grams of polymer (total PPD-T and PVP) per 100 milliliters of solvent. When concentrated sulfuric acid of 1.84 grams per cubic centimeter is used, the spinning dopes are generally 16.0 to 21.0 weight percent polymer. It is important that the total concentration of polymer be such that the spinning dopes are anisotropic. To experience the benefit of this invention, the polymer in the spinning dope should be greater than about 3 weight percent and less than about 30 weight percent PVP, based on the weight of the PPD-T. The fibers of this invention are considered to be made from the combination of PVP and PPD-T; and the usual additives such as dyes, fillers, delusterants, UV stabilizers, antioxidants, flame retardants, and the like can be incorporated into the combination of PVP and PPD-T which constitutes the fibers.

The spin dope of this invention, when made using PPD-T homopolymer and concentrated sulfuric acid, has a melting point which decreases slightly from 72° C. at 3% PVP to 71° C. at 6% PVP and then increases regularly through about 75° C. at about 15% PVP and decreases again to 72° C. at above 20% PVP.

The freezing point of these dopes decreases from about 30° C. at 3% PVP to about 25° C. at 6 to 9% PVP and then increases regularly through about 38° C. at about 15% PVP and decreases again to 24° C. at above 20% PVP.

Dopes of this invention can be extruded at any temperature at which they are liquid. Since the degree of polymer degradation is, in some ways, a function of time and temperature, dope temperatures which are as low as practical should be used. The dopes of this invention are optically anisotropic. That is, in bulk, they depolarize plane polarized light because the light transmission properties of microscopic volumes of the dope vary with direction. Microscopic domains in the dopes are birefringent.

The dopes of this invention are spun by customary means such as has been taught in U.S. Pat. No. 3,767,756 issued Oct. 23, 1973 on the application of Blades—incorporated herein by reference.

Fibers of this invention can be heat treated after drying or in conjunction with drying. Heat treating is conducted at 250° to 550° C. for 1 to 6 seconds under a tension of 1 to 12 grams per denier; and the heat treatment results in fibers of increased moduli. Up to now, it has generally been the case that high tenacity para-aramid fibers suffer a decrease in tenacity as a result of heat treatment. Quite surprisingly, it has been discovered that fibers of this invention, having the combination of PPD-T and PVP with about 12–17% PVP, do not suffer a decrease in tenacity as a result of heat treatment under these conditions.

It is believed that the PVP used in this invention, makes some combination with the PPD-T. PVP is known to be soluble in water and, yet, in the fibers of this invention with PVP up to as much as 30%, significant amounts of PVP are not leached out in water. As was described, above, newly-spun filaments are coagulated in aqueous solutions. Significant amounts of PVP are not leached from the coagulated filaments into the coagulation bath.

Many of the qualities of the fiber of this invention are controlled or altered by the amount of PVP which is included in the fibers. As stated, PVP can be present in amounts from 3 to 30 weight percent based on weight of the PPD-T. The lower limit is a limit of practicality because, although the benefits of the invention will be present at any concentration of PVP, the benefits are difficult to measure at concentrations of less than about 3 weight percent.

The upper limit represents the concentration at which some qualities of the fiber begin to deteriorate due to the presence of excess PVP. It should be recognized that PVP is not known to be an outstanding or even impressive fiber forming material; and that, even though its presence in fibers in combination with PPD-T yields fibers of excellent and entirely unexpected improvements, there is a concentration for the PVP above which some qualities of the fibers are not acceptable. It is believed that above about 30 weight percent of PVP, based on PPD-T, the PVP is irreversibly leached from the fiber into the coagulation bath during manufacture.

Dyeability—Fibers made wholly from para-aramid are very difficult to dye because the dye substances cannot easily penetrate the molecular structure of the fibers. On the other hand, fibers of this invention are easily colored by dying. At PVP concentration of as little as 3 weight percent of the para-aramid, basic dyes can be used to color the fibers by usual dying processes. Basic dyes are dyes which have cationic groups in the dye molecule. Dyeability using basic dyes increases with increasing PVP concentration to a maximum at about 15 weight percent PVP based on para-aramid; and beyond 15 percent there is little change in basic dye dyeability.

Dyeability using acid dyes is rather low until the PVP concentration reaches about 12–15 weight percent based on para-aramid; at which concentration, acid dye dyeability increases abruptly and remains high with further increase in PVP concentration. Acid dyes are dyes which have anionic groups in the dye molecule.

From the above, it is seen that any concentration of PVP in the fibers of this invention will result in improved dyeability whether the PVP concentration is within the preferred range of up to 30 weight percent or not.

Fiber Density—The density of fibers made from PPD-T is about 1.45 grams per cubic centimeter. The density of PVP is usually given as 1.29 grams per cubic centimeter. Fibers of the present invention have a density which varies with the concentration of PVP in the fiber. The density of the fibers of this invention decreases steeply from 1.45 g/cc at low PVP concentration to a minimum of about 1.36 g/cc from about 7 to 12 percent PVP; and then increases in a regular way as the PVP concentration increases, approaching the density of PVP. Fibers having PVP in the range of 3 to 17 weight percent, based on the amount of PPD-T, have a density substantially below the density which would be expected for such a combination of polymers. The reason for the decreased density of the fibers of this invention is not understood.

Non Round shape—Fibers which are spun from round spinnerets are generally round and, in general, spun fibers take the shape of the spinneret from which they are extruded. The fibers of the present invention are out-of-round in a random way. It has been found that fibers of this invention, spun in accordance with the process set out above, emerge from the coagulation bath with an irregular, vaguely hexagonal, shape.

Figure 2:
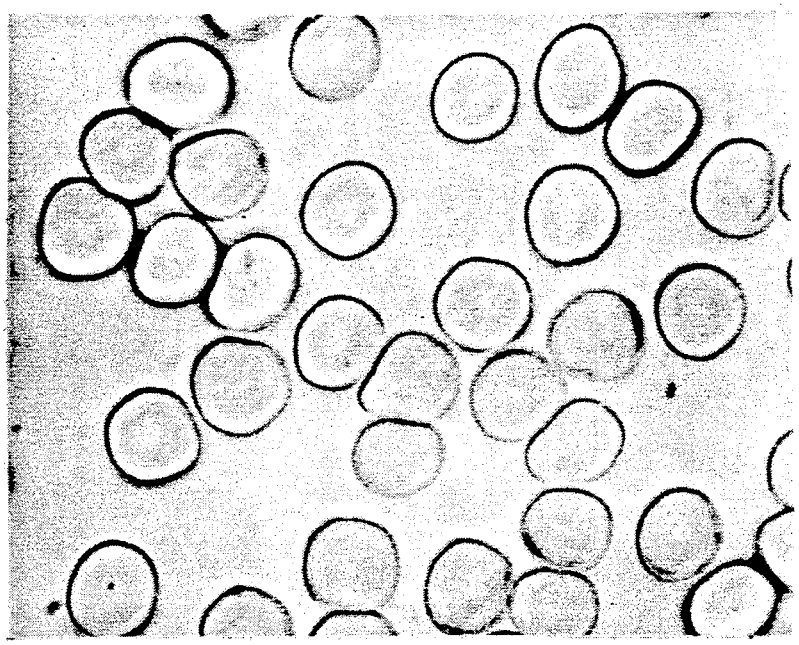
FIG. 2 is a greatly enlarged photograph of cross sections of fibers of the prior art consisting of PPD-T, alone.
Figure 3:
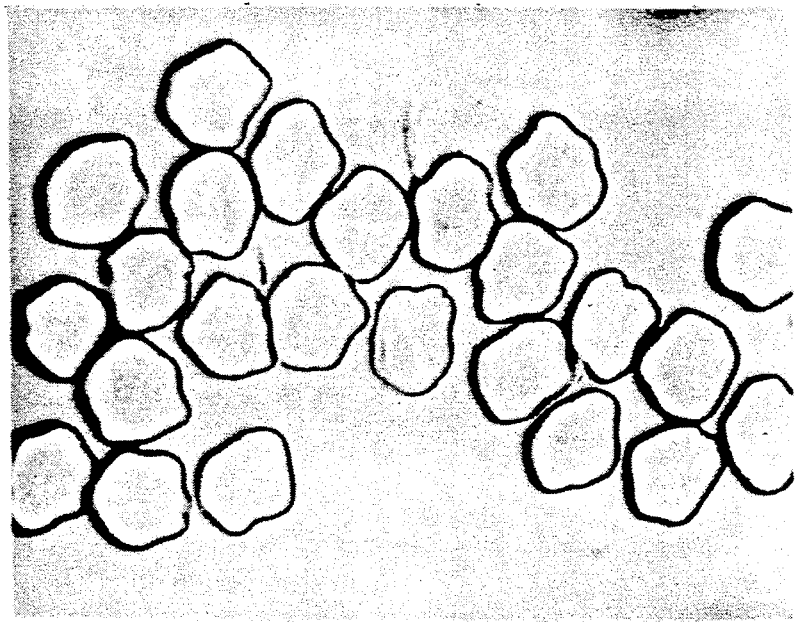
FIG. 3 is a greatly enlarged photograph of cross sections of fibers of the present invention.

FIG. 2 is a photograph of PPD-T fibers spun in accordance with the prior art such as is disclosed in U.S. Pat. No. 3,767,756. The fibers are shown to have a round cross-section. FIG. 3 is a photograph of fibers of this invention made by the same process wherein there is included 12 weight percent PVP, based on PPD-T. The fibers of each Fig. were spun from a spinneret with round apertures of 0.063 mm diameter; and the degree of magnification in each Fig. is 1000×.

The reason for the nonround shape of fibers of this invention is not entirely understood. The nonround fiber shape is present in fibers of this invention having greater than about 9 percent PVP based on the PPD-T in the fibers. Nonround fibers have higher surface area than round fibers and, therefore, exhibit improved adhesion to matrix materials compared with round fibers of the same denier; and exhibit considerably softer hand than round PPD-T fibers.

Thermal Resistance—In addition to the noted improvements for the individual fibers of this invention, it has been found that the fibers, when made into fabrics, exhibit surprising improvements in thermal resistance and resistance to burning. It has been found that fabrics made from fibers of this invention which include 6 to 20 weight percent PVP based on PPD-T, exhibit a substantial improvement in resistance to burning.

Resistance to Heat Aging—As an additional indication of the improved heat stability of fibers of the present invention, it can be pointed out that these fibers exhibit a significant increase in strength retained after exposure to heat as compared with PPD-T fibers of the prior art. In tests identified as Heat Aged Strength Retention, it has been determined that fibers of this invention containing 12% of PVP based on weight of PPD-T retain 94% of initial strength as compared with 82% for a wholly PPD-T fiber of the same size and conditioning.

Adhesion to Elastomeric Matrices—Para-aramid fibers are often used as reinforcing materials in polymeric matrices such as in rubber articles. In order for para-aramid fibers to function as acceptable reinforcing materials, they must demonstrate acceptable adhesion to the matrix. Increased adhesion to the matrix translates into improved reinforcement. It has been found that the fibers of the present invention exhibit an adhesion to rubber that is twice as high as the adhesion to rubber of PPD-T fibers of the prior art.

Test Methods

Linear Density

This is usually calculated as denier, that is, the weight in grams of a 9000-meter length of yarn. Multiplication of denier by 1.111 yields linear density in dtex.

Tensile Properties

Tenacity is reported as breaking stress divided by linear density. Modulus is reported as the slope of the initial stress/strain curve converted to the same units as tenacity. Elongation is the percent increase in length at break. Both tenacity and modulus are first computed in g/denier units which, when multiplied by 0.8838, yield dN/tex units. Each reported measurement is the average of 10 breaks.

Specific tenacity is the breaking stress divided by the linear density of the fiber under test corrected for the amount of PVP. Because PVP adds very little to the strength of the fibers compared with the contribution of the PPD-T, tenacity of the fiber can be corrected for the presence of PVP. Specific tenacity is a measure of the strength of the PPD-T in the fiber and is determined by dividing the tenacity by the weight fraction of the PPD-T in the fiber.

Tensile properties for yarns are measured at 24° C. and 55% relative humidity after conditioning under the test conditions for a minimum of 14 hours. Before testing, each yarn is twisted to a 1.1 twist multiplier (for example, nominal 1500 denier yarn is twisted about 0.8 turns/cm). Each twisted specimen has a test length of 25.4 cm and is elongated 50% per minute (based on the original unstretched length) using a typical recording stress/strain device.

The twist multiplier (TM) correlates twist per unit of length with linear density of a yarn being twisted. It is computed from $$TM = (denier)^{\frac{1}{2}}(tpi)/73 \text{ where tpi=turns/inch}$$

$$TM = (dtex)^{\frac{1}{2}}(tpc)/30.3 \text{ where tpc=turns/cm}$$

Dyeability

Dyeability of fibers for this invention was determined by dying the fibers using red dye and measuring the "a" color component using a "Hunter" colorimeter such as that sold by Hunterlab of Reston, VA, USA. The procedure for color determination is AATCC Test Method 153-1985; "AATCC" stands for American Association of Textile Chemists and Colorists.

For the purposes of this invention, the absolute values of the "a" value determined from the test are not important. The differences in dyeability between fibers are easily seen by relative values from one fiber to another. On the "a" scale, a value of zero is neutral and a positive value of 30 is brilliant red.

Burning Resistance

This is a test designed to simulate the heat from a petroleum fuel fire with a 50/50 combination of convection and radiant heat for a total heat flux of 2.0 cal/cm$^2$ sec. The test is identified as NFPA Test Method 1971, Section 5-1. NFPA stands for National Fire Protection Association.

For purposes of this test, the sample is a single layer of fabric prepared from a yarn of fibers to be evaluated; and the heat sensor is not used because speed and degree of char is the quality to be investigated.

Heat Aged Strength Retention (HASR)

HASR is a test to determine how much of its initial strength a fiber retains after heat aging. HASR is reported in percent of the breaking strength retained after exposure to controlled heat.

To conduct the test, a fresh fiber sample is conditioned at 55% relative humidity and 23° C. for 14 hours. A portion of the sample is subjected to dry heat at a temperature of 240° C. for 3 hours and is then tested for tensile strength (Tenacity$_{Heat\ Aged}$). As a control, a portion of the sample without heat treatment is, also, tested for tensile strength (Tenacity$_{Unaged}$).

$$HASR = \frac{Tenacity_{Heat\ Aged}}{Tenacity_{Unaged}} \times 100$$

Adhesion to Rubber

This rubber adhesion test is used to evaluate only the adhesive bond (peel strength) between unflexed rubber and reinforcing cord layers embedded in the rubber. The test specimens are themselves reinforced rubber goods. The test employed is as described in ASTM D2630-71, but several details either not given therein or slightly modified herein are specified below.

A total of 12 test specimens (including at least 2 controls) are cut from a single plied assembly. Each test specimen is 1 inch (2.5 cm) wide and 4.5 inch (11.4 cm) long and has, at the center of its thickness, an inserted polyester sheet extending inward 1 inch (2.54 cm) from only one end for subsequent opening of the ends for testing. Each test specimen is an eight-layer sandwich consisting of two layers of rubber stock, a layer of spaced and parallel cords, two central layers of rubber stock, a second layer of spaced and parallel cords, and two layers of rubber stock. The rubber stock used is representative of those used commercially. It is a sheet of high modulus, all-natural rubber stock 0.015 in (0.38 mm) thick and 12 in (305 mm) wide. The cord layers to be tested are made from aramid yarns of 1500 denier and are identified as 1500/1/2 wound at 36 ends/in (14.2 ends/cm). Winding tension is 225±25 grams. The twist multiplier is 6.5. Final molding is in a mold preheated to 160±2° C. under 7 tons (62.3 kN) pressure for 20 minutes.

Testing for room temperature rubber adhesion involves doing the following at room temperature: opening an end of a specimen to remove the piece of polyester film, inserting one separated end into each of the clamps of a laboratory stress/strain tester to at least 1 in (2.5 cm) so that the specimen is centered, and separating the clamps at a crosshead speed of 5 in (12.7 cm) per minute. Full-scale load should be adjusted to 100 lb (45.45 kg), and chart speed of 2 in (5.08 cm) per minute is preferred. The chart will record a series of peaks. The very first peak is ignored and, if peak height decreases near the end of the test, only those of the first inch (2.5 cm) of the chart are considered. A line is drawn through the peaks and the fraction of full-scale it is above the zero line is determined. Multiplying this fraction by the full-scale load yields "peel strength" in whatever units the load is in.

Failure of each specimen in testing can be totally within a rubber layer, or at the cord/rubber interface, or a combination of the two. Each break is also rated for "appearance" on a scale of 1 to 5 where 1 means cords are completely uncovered and 5 means no cord at all is visible.

DESCRIPTION OF THE PREFERRED EMBODIMENTS

In the Examples which follow, all parts are by weight unless specifically stated to be to the otherwise. Example 1. This Example describes the preparation of fibers in accordance with the present invention.

Sulfuric acid having a concentration of 101% (23.04 parts) was stirred and cooled in a closed vessel to −5° C. A mixture of poly(p-phenylene terephthalamide) (PPD-T) having an inherent viscosity of 6.3 (5.00 parts) and poly(vinylpyrrolidone) (PVP) having a molecular weight of 40,000 (0.60 parts) was added to the vessel. The mixture of polymer and acid was stirred while the temperature was gradually increased to 85° C. The mixture was stirred for two hours at 85° C. under a reduced pressure of 25 mmHg to eliminate air bubbles. The resulting dope was extruded through a 267-hole spinneret having orifice diameters of 0.063 mm; and the extruded dope was drawn through an air gap of 0.7 cm length into an aqueous coagulating bath at 5° C. The extruded dope was stretched 6.3X in the air gap. The resulting fiber was washed with dilute aqueous alkali and water, dried on a roll at 180° C., and wound up at 594 m/min.

For these fibers, the PVP concentration was 12% based on weight of PPD-T. The yarn tenacity/elongation/modulus/filament linear density was 23.9 gpd/3.04%/753 gpd/1.5 den.(21.1 dN/tex/3.04%/665 dN/tex/1.7 dtex).

As a control, an identical spin except using only PPD-T without added PVP at the same spin-dope concentration resulted in yarns having tenacity/elongation/modulus of 22.5 gpd/3.01%/690 gpd/1.5 denier (19.9 dN/tex/3.01%/610 dN/tex/1.7 dtex). The Heat Aged Strength Retention (HASR) was determined to be 94% for the fibers containing PVP and only 82% for the control.

EXAMPLES 2-9

These examples describe the variation of tensile properties with variation in the amount of PVP present in the fibers.

The procedure of Example 1 was repeated using the same conditions and materials except that the amounts of PPD-T, PVP, and sulfuric acid were altered as shown in Table 1. Tensile properties for the fibers of these examples and for the fibers of Example 1 and the Control are summarized in Table 2; and the specific tenacity for the fibers of these examples is shown in FIG. 1 as a function of PVP control in the fibers.

TABLE 1

| Example | PPD-T (pts) | PVP (pts) | Sulfuric acid (pts) | % PVP per PPD-T |
|---------|-------------|-----------|---------------------|-----------------|
| Control | 5.00        | 0.00      | 20.64               | 0               |
| 2       | 5.00        | 0.15      | 21.27               | 3               |
| 3       | 5.00        | 0.30      | 21.89               | 6               |
| 4       | 5.00        | 0.45      | 22.52               | 9               |
| 1       | 5.00        | 0.60      | 23.04               | 12              |
| 5       | 5.00        | 0.75      | 23.78               | 15              |
| 6       | 5.00        | 1.00      | 24.82               | 20              |
| 7       | 5.00        | 1.50      | 26.92               | 30              |
| 8       | 5.00        | 2.00      | 29.27               | 40              |
| 9       | 5.00        | 2.50      | 31.10               | 50              |

TABLE 2

| Example | Yarn Properties | | | | | | Fiber Density (g/cc) |
|---|---|---|---|---|---|---|---|
| | Tenacity | | Elong % | Modulus | | Specific Tenacity | |
| | gpd | dN/tex | | gpd | dN/tex | | |
| Control | 22.5 | 19.9 | 3.01 | 690 | 610 | 22.5 | 1.4583 |
| 2 | 21.0 | 18.6 | 2.93 | 679 | 600 | 21.6 | 1.4125 |
| 3 | 18.3 | 16.2 | 2.41 | 737 | 651 | 19.4 | 1.3687 |
| 4 | 19.8 | 17.5 | 2.66 | 707 | 625 | 21.6 | 1.3484 |
| 1 | 23.9 | 21.1 | 3.04 | 753 | 665 | 26.8 | 1.3547 |
| 5 | 22.6 | 20.0 | 3.23 | 707 | 625 | 26.0 | 1.3702 |
| 6 | 20.1 | 17.8 | 3.10 | 651 | 575 | 24.1 | 1.3781 |
| 7 | 17.6 | 15.6 | 2.97 | 610 | 539 | 22.9 | 1.3828 |
| 8 | 16.0 | 14.1 | 2.91 | 577 | 510 | 22.4 | 1.3805 |
| 9 | 14.9 | 13.2 | 2.70 | 530 | 468 | 22.4 | 1.4048 |

EXAMPLES 10 and 11

These examples describe fibers of this invention using PVP of different molecular weights.

This procedure of Example 1 was repeated using the same conditions and materials except that PVP of differing molecular weights was used as shown in Table 3.

TABLE 3

| Exam. | % PVP/ PPD-T | M.W. PVP | Yarn Properties | | | | |
|---|---|---|---|---|---|---|---|
| | | | Tenacity | | Elong. (%) | Modulus | |
| | | | gpd | dN/tex | | gpd | dN/tex |
| 10 | 12 | 10,000 | 22.0 | 19.4 | 2.98 | 746 | 659 |
| 1 | 12 | 40,000 | 23.9 | 21.1 | 3.04 | 753 | 665 |
| 11* | 12 | 360,000 | 19.8 | 17.5 | 2.58 | 774 | 684 |

*Experienced difficulty in spinning due to high dope viscosity at this polymer concentration.

EXAMPLE 12

This example describes the dyeability of fibers of this invention.

A basic dye bath was made using 1 gram of Maxilon Red GRL dye (C.I. Basic Red 46), 6 ml glacial acetic acid and 500 ml distilled water. In a series of experiments, two grams of each of several different fibers were added to the dye bath and steeped at 110° C. for about 2 hours. The fibers were then rinsed, scoured at 110° C. with liquid soap for 1 hour, and thoroughly rinsed again in water. Fibers from Examples 1 through 7 were dyed by this procedure for evaluation in this Example. Dyeability showed a remarkable increase at 6% PVP, showed a maximum at about 15% PVP, and was still very high at 30% PVP.

The same procedure was used to dye the fiber samples with an acidic dye identified as Erio Red (C.I. Acid Red 182). Using an acid dye, there was a sudden increase in dyeability of fibers between 15 and 20% PVP and the dyeability continued to 30% PVP.

The degree of dyeability was determined by means of the above-described AATCC Test Method 153-1985 reporting the red color value "a". The red color values "a" for each of the dye tests are listed below in Table 4.

TABLE 4

| % PVP per PPD-T | "a" Value | |
|---|---|---|
| | with Basic Dye | with Acid Dye |
| 3 | 1.26 | −1.03 |
| 6 | 10.39 | 1.25 |
| 9 | 20.62 | 5.58 |
| 12 | 26.22 | 9.05 |
| 15 | 29.27 | 8.36 |
| 20 | 22.33 | 19.25 |
| 30 | 18.85 | 19.06 |

EXAMPLE 13

This example describes the flame resistance of the fibers of this invention.

A single layer of fabric knitted from samples of 400 denier fiber containing 12% of PVP was prepared according to Example 1 and was tested in accordance with NFPA Test Method 1971, Section 5.1, as above-described with a controlled heat rate of 2 cals/cm$^2$ sec. That fabric was compared with a fabric knitted from the control yarn of Example 1. The control fabric charred and broke open after 8 seconds, and after 10 seconds showed substantial break open accompanied by puckering. The fabric made from the fiber of this invention showed no break open or puckering even after 10 seconds. Example 14. This example describes the rubber adhesion of the fibers of this invention using only a minimum of adhesion promoting subcoating material.

Test specimens were made in accordance with the procedure set out above using fibers made from a combination of PVP and PPD-T wherein there was 15% PVP, based on the weight of the PPD-T. The control fibers were made from PPD-T. The cords were prepared as described and were dipped in a subcoating bath of 26 weight % epoxy-based RFL Resin and dried and cured for 60 seconds at a temperature of 450° C. The cords were tested in accordance with the procedure.

The control exhibited a peel strength of 22.6 pounds and an appearance of 1. The test fibers of this invention exhibited a peel strength of 40.2 pounds and an appearance of 4.5.

I claim:

1. A process for making a fiber consisting essentially of para-aramid and poly(vinyl pyrrolidone) (PVP) [PVP] comprising the steps of:
   (A) agitating an anisotropic mixture of:
      i) solvent acid;
      ii) para-aramid having an inherent viscosity of at least 4 in an amount which is at least 16 percent, by weight, of the mixture; and
      iii) PVP having a molecular weight of 10,000 to 360,000 [at least 1000] in an amount which is from 3 to 30 [at least 3] percent, by weight, of the para-aramid;
   (b) heating the mixture with continued agitation to a temperature above the melting point of the mixture to form a uniform solution;
   (c) extruding the solution through a spinneret;
   (d) drawing the extruded solution through a non-coagulating fluid layer 0.5 to 2.5 centimeter thick and stretching the extruded solution 3 to 10 times its original length in the non-coagulating layer;
   (e) passing the stretched solution into and through an aqueous coagulating bath having a temperature of −5° to 25° C. to form filaments; and
   (f) washing the filaments with water or dilute aqueous alkali.

2. The process of claim 1 wherein the para-aramid is PPD-T.

* * * * *

UNITED STATES PATENT AND TRADEMARK OFFICE
CERTIFICATE OF CORRECTION

PATENT NO.   : 5,135,687
DATED        : August 4, 1992
INVENTOR(S)  : Kiu-Seung Lee It is certified that error appears in the above—identified patent and that said Letters Patent is hereby corrected as shown below:

Claim 1:

Column 10, line 42, delete "[PVP]".

Column 10, line 50, delete "[at least 1000]".

Column 10, line 51, delete "[at least 3]".

Signed and Sealed this

Tenth Day of August, 1993

Attest:

MICHAEL K. KIRK

*Attesting Officer*      Acting Commissioner of Patents and Trademarks